Feb. 27, 1923.
M. FRUCHTL
1,446,895
FRICTION HUB AND SHOCK ABSORBER
Filed Mar. 29, 1922
3 sheets-sheet 1
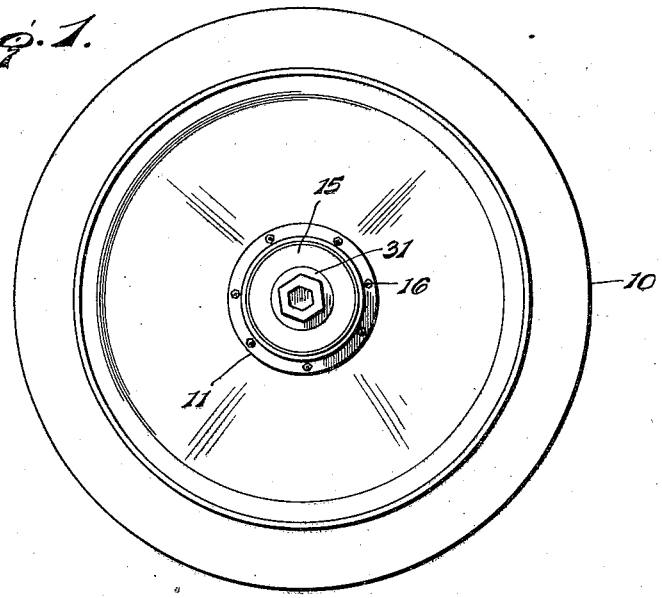
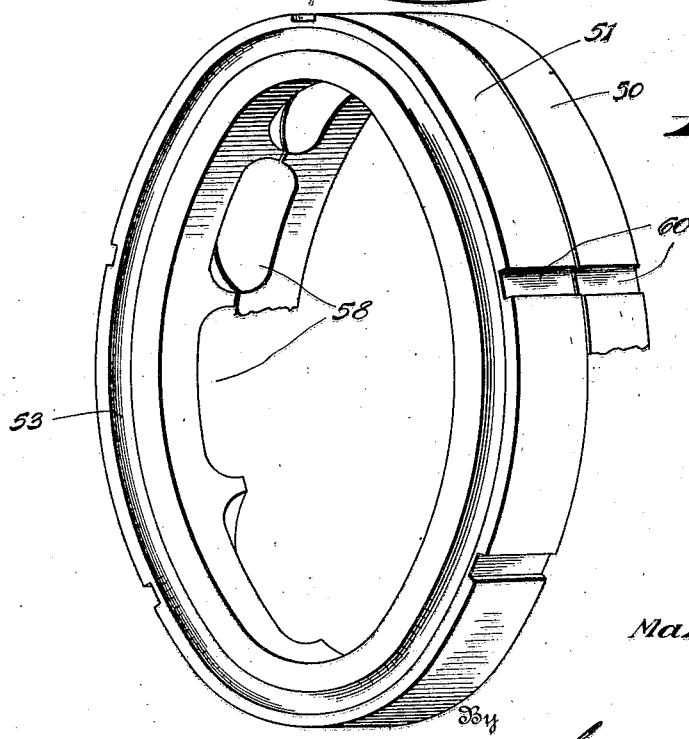
Inventor
Martin Fruchtl.
By
Lacey & Lacey, Attorneys Feb. 27, 1923.
M. FRUCHTL
FRICTION HUB AND SHOCK ABSORBER
Filed Mar. 29, 1922
1,446,895
3 sheets-sheet 2
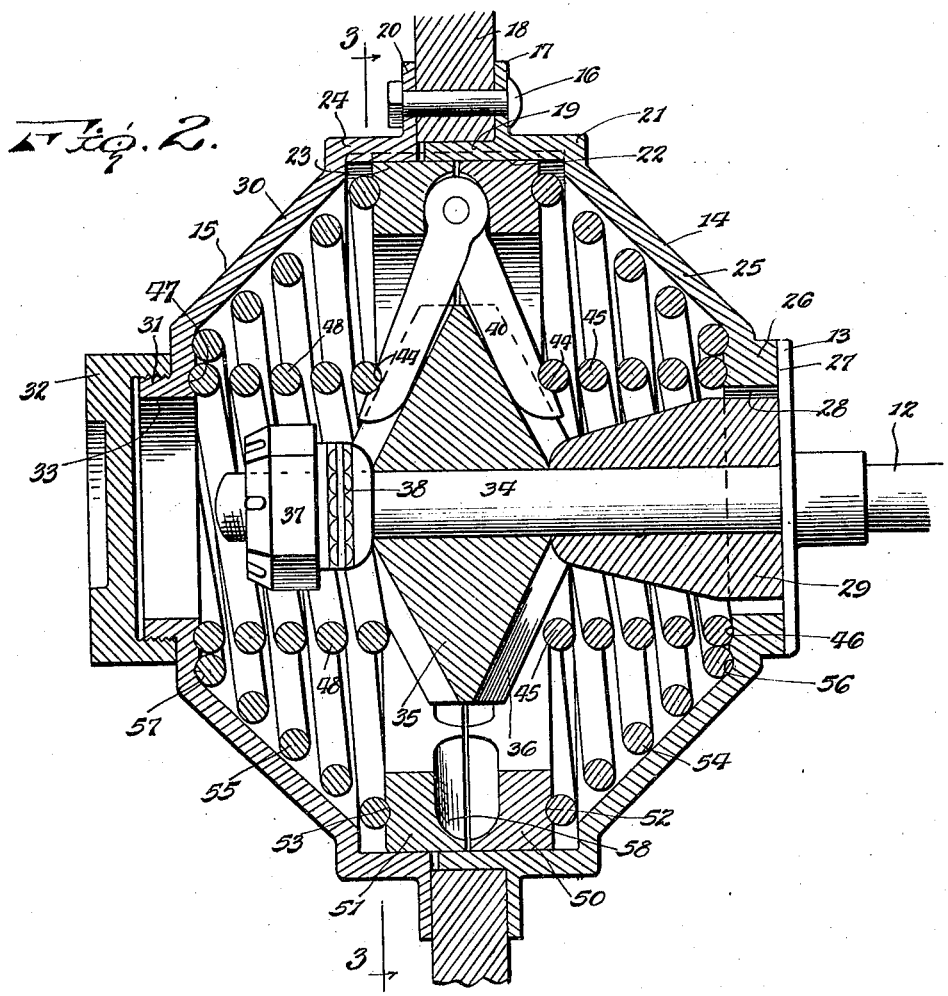
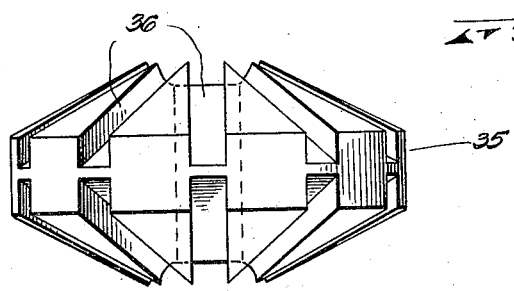
Inventor
Martin Fruchtl.
By *[signature]*, Attorneys Feb. 27, 1923.

M. FRUCHTL 1,446,895

FRICTION HUB AND SHOCK ABSORBER

Filed Mar. 29, 1922

Inventor

Martin Fruchtl.

By

Attorney

Patented Feb. 27, 1923.

1,446,895

UNITED STATES PATENT OFFICE.

MARTIN FRUCHTL, OF SALEM, ILLINOIS.

FRICTION HUB AND SHOCK ABSORBER.

Application filed March 29, 1922. Serial No. 547,787.

*To all whom it may concern:*

Be it known that I, MARTIN FRUCHTL, a citizen of the United States, residing at Salem, in the county of Marion and State of Illinois, have invented certain new and useful Improvements in Friction Hubs and Shock Absorbers, of which the following is a specification.

The present invention relates to wheel hubs designed as shock absorbers and the main object of the invention is to provide hubs of this class that, when applied to vehicle wheels, will make pneumatic tires unnecessary.

For this reason the hubs are constructed, so that they are able to absorb within themselves, all vibrations set up in the wheels, when running over uneven ground and to considerably lessen any external shocks from the wheels striking an obstacle whether in axial or radial direction.

Another object of the invention is to transfer all radial vibrations and shocks in the wheel into axial ones. As the wheel axle in this manner is subjected to strains in its length direction where it possesses the greatest strength, instead of in its transverse or radial directions, where it is weaker, breakage with consequent accidents will to a great extent be prevented.

In the accompanying drawings one embodiment of the invention is illustrated; and Figure 1 shows an elevation of a vehicle wheel with the improved hub in place;

Figure 2 is an axial section in larger scale of the wheel hub itself;

Figure 4 is a plan view of one of the details;

Figure 6 is a perspective fragmentary view of some other details.

Figure 3:
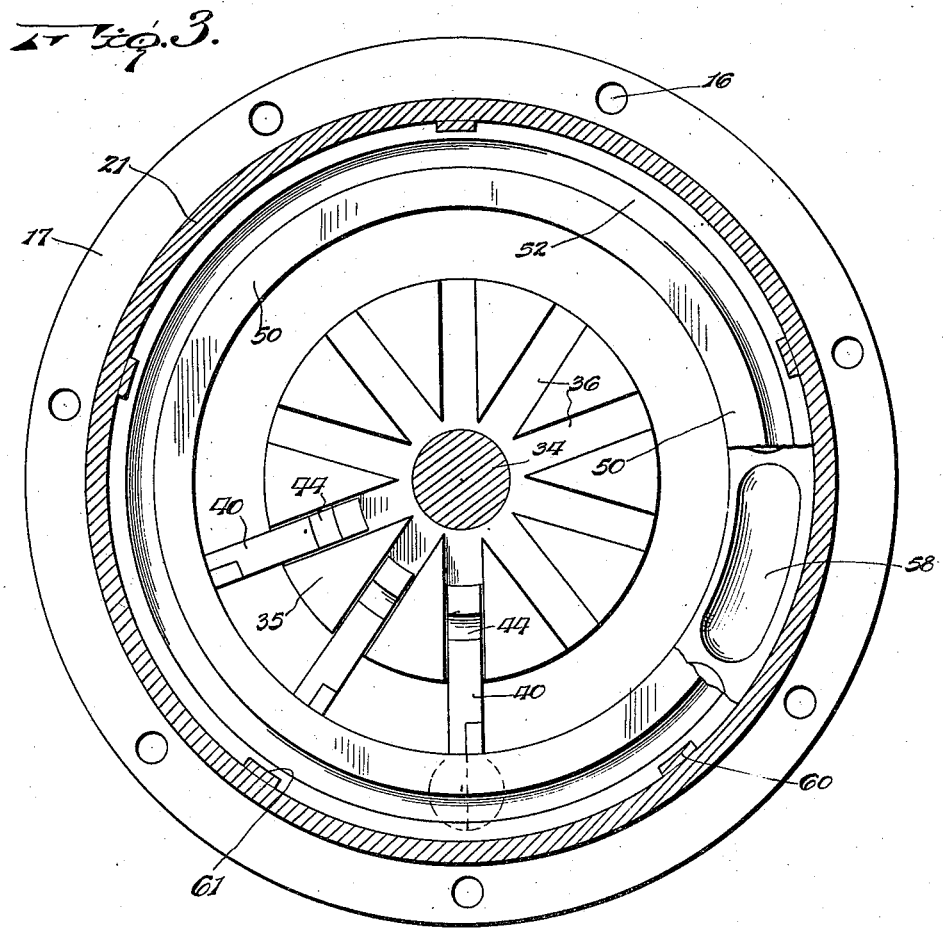
Figure 3 is a section along line 3—3 of Figure 2.

In the drawings reference numeral 10 represents a vehicle wheel of any usual type whether with spokes or constructed as a disk wheel or made of wood or metal. On this wheel a hub 11 is shown.

Referring particularly to Figure 2 reference numeral 12 is the wheel axle having a collar 13 against which the housing abuts. This housing is made of two hollow shells 14 and 15 which are clamped together by means of bolts 16 engaged through radial flanges 17 and 20 between which the spokes or the disk portion 18 of the wheel 10 is rigidly held. The disk portion 18 abuts against the cylindrical wall 19 provided on the inner shell 14 and spaced from the radial flange 20 on the outer shell 15 of the housing. This cylindrical flange forms a continuation of the cylindrical part 21 of the inner shell and the inner face 22 thereof is flush with the inner face 23 of a corresponding cylindrical part 24 on the outer shell 15. The inner shell continues inwardly from the cylindrical part 21 by means of a cone shaped wall 25 which terminates with a cyindrical boss 26 abutting with its plain inner face 27 against the axle collar 13 and is provided with a central bore 28 of greater diameter than the filler piece 29 on the axle.

The outer shell 15 is constructed in a similar manner with a conical wall 30 connecting the cylindrical part 24 with the threaded cylindrical end 31 and a cap 32 is threaded over this end to close the opening 33 therein.

Upon the axle arm 34 is mounted a double cone 35, which is tapering outwardly and provided with a plurality of radial grooves 36 along its inner and outer tapering sides. This double cone 35 is held in position by means of a nut 37 threaded on the end of the axle arm 34 and between the same and the cone is preferably inserted a ball bearing 38, the other end of the cone abutting against the outer end of the filler piece 29. In this manner a certain amount of friction will be set up between the cone and its end faces in order to hold it semi-rigid on the axle arm. In case of drive wheels it may be preferable to provide a key between the axle arm and the double cone 35.

Figure 5:
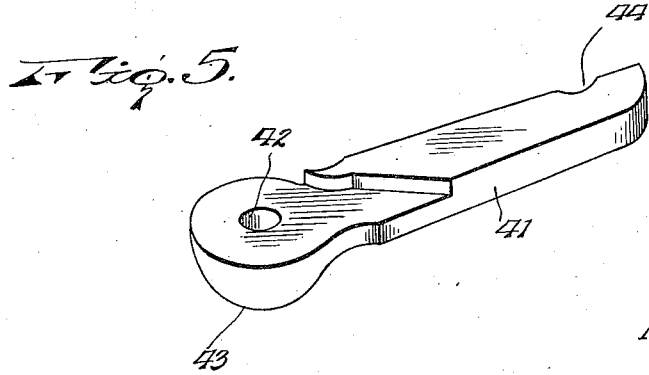
Figure 5 is a perspective view of another detail.

Wedge members 40 each comprise a pair of fingers 41, see Figures 2 and 5, which are pivoted together at 42 the joint forming a spherical head 43. The fingers 41 are adapted to engage in the flutes or grooves 36 provided in the double cone 35 and near their ends each finger has a slight nick or recess 44. With the wedge members 40 placed around the double cone 35 each member engaging in a pair of grooves with their fingers 41, these nicks or recesses 44 will all be situated in circles of the same diameter as the helical spring 45 which with its one end coil engages in the recesses 44 and with its coil at opposite end engages in an annular groove 46 formed in the inner face of the shell 14. Another coil spring 48 similarly engages in the other recesses 44 and the annular groove 47 in the inner face of the outer shell 15.

A pair of cylindrical disks 50 and 51 engage with their cylindrical outer faces the inner cylindrical surfaces 22 and 23 of the shells 14 and 15 and the added length of these disks is considerably less than the distance between the opposite cone faces of the two shells. The disks 50 and 51 are grooved as at 60 to engage with corresponding keys 61 provided in the housing so that there will be at no time any circumferential displacement between the disks and the housing. Each of these disks 50 and 51 are provided with annular grooves 52 and 53 respectively in which the large end coils of cone springs 54 and 55 respectively engage, the small end coils of which engage corresponding annular grooves 56 and 57 in the inner and outer shells. The springs 54 and 55 are tapered approximately the same amount as the conical walls 25 and 30 of the shells and are of such diameters that they always are spaced from said walls whether compressed or expanded.

The opposing surfaces of the disks 50 and 51 are provided with recesses 58 facing each other and in which the spherical heads 43 of the wedge members are received. These recesses 58 are oblong in circumferential direction of the disks 50 and 51 and are tapered in radial direction, so that the heads 43 do not abut on the recesses but are suspended on the sloping side surfaces thereof. The disks 50 and 51 are, when assembled together with the wedge members, spaced slightly apart and it will now be evident that the axle arm with the double cone 35 resting in the V formed between the fingers 41 of the wedge members is floating within the casing and supported by means of the springs 45, 48, 54 and 55 through the intermediary of the disks 50 and 51. The strength of the springs is so selected that the axis of the axle arm will coincide with the axis of the housing under normal load but if vibrations are set up within the wheel whether radially or axially, the double cone 35 will act between the fingers 41 of the wedge members in such a manner that they are spread apart thereby compressing springs 45, 48, which thereupon exert pressure in axial direction against both shells of the housing. Similarly a radial shock on the wheel rim will cause a displacement in a vertical plane between the double cone, the wedge members and the disks 50 and 51, whereby the latter will be pressed apart by the heads 43 of the wedge members, thereby exerting a compression action on the cone springs 54 and 55, which in turn transmits this pressure in axial direction against the shells 14 and 15. A side blow on the wheel rim will also be transferred to axial strain on the axle arm although this will result in the tilting of the housing around the same but the axial compression of the springs will occur in the same manner.

Having thus described the invention what is claimed as new is:

1. A wheel hub comprising a housing surrounding an axle arm, a wedging member carried by said axle arm, and provided with grooves situated in radial planes, supporting elements for said member, each of said elements including a pair of fingers engaging in said grooves and hinged together to form a spherical head, and yieldable means inserted between said elements and said housing.

2. A wheel hub comprising a housing surrounding an axle arm, a wedging member carried by said axle arm, and provided with grooves situated in radial planes, supporting elements for said member, each of said elements including a pair of fingers engaging in said grooves and hinged together to form a spherical head, disks slidably mounted in said housing in axial direction, said disks having radially tapering recesses adapted to receive said heads and yieldable means inserted between said housing and said disks and fingers respectively.

3. The combination of an axle arm, of a wheel hub, said hub comprising a conical member mounted upon said arm and tapering outwardly in radial direction from said arm, said conical member being provided with radial grooves, wedge members each including a pair of hinged fingers and engaging in said grooves, a spherical head being formed at the hinged end of said fingers, a pair of supporting disks having radially tapering recesses formed between them adapted to grip said heads, a casing having a cylindrical interior surface engaging with the outer surfaces of said disks and springs abutting at one end against the walls of the casing and with the other end engaging respectively with said fingers and said disks.

4. The combination of an axle arm, of a wheel hub, said hub comprising a conical member mounted upon said arm and tapering outwardly in radial direction from said arm, said conical member being provided with radial grooves, wedge members each including a pair of hinged fingers and engaging in said grooves, a spherical head being formed at the hinged end of said fingers, a pair of supporting disks having radially tapering recesses formed between them adapted to grip said heads, a casing having a cylindrical interior surface engaging with the outer surface of said disks and springs abutting at one end against the walls of the casing and with the other end engaging respectively with said fingers and said disks, keys inserted between said disks and said casing permitting axial reciprocation of the disks in the casing.

5. A wheel hub comprising a housing surrounding an axle arm, an axially slidable disk in said housing provided with a tapered side surface, a spring co-axial with said axle arm and acting in axial direction between said housing and said disk, and wedging means inserted between the axle arm and the tapered side of said disk, said wedging means including a cone member mounted upon the axle arm.

6. A wheel hub comprising a housing surrounding an axle arm, axially slidable disks in said housing, provided with oppositely situated concave surfaces on their inner periphery, springs co-axial with said axle arm and acting between said housing and said disks tending to hold said disks together and wedging means inserted between the axle arm and said concave surfaces of the disks, said wedging means including a cone member mounted upon the axle arm.

7. A wheel hub comprising a housing surrounding an axle arm, a cone member revolubly mounted on the axle arm, wedge members inserted between said cone member and said housing and springs co-axial with said axle arm engaging said housing and tending to hold said wedge members pressed against the conical side of the cone member.

8. A wheel hub comprising a housing surrounding an axle arm, a cone member revolubly mounted on the axle arm, wedge members inserted between said cone member and said housing and including hinged fingers, springs co-axial with said axle arm, engaging said housing and tending to hold said fingers pressed against the conical sides of the cone member.

9. A wheel hub comprising a housing surrounding an axle arm, a cone member revolubly mounted on the axle arm, wedge members inserted between said cone member and said housing and including hinged fingers, springs co-axial with said axle arm engaging said housing and tending to hold said fingers in slidable engagement with the conical sides of the cone member.

In testimony whereof I affix my signature.

MARTIN FRUCHTL. [L. S.]